(12) United States Patent
Kullberg et al.

(10) Patent No.: US 6,336,424 B1
(45) Date of Patent: Jan. 8, 2002

(54) DEVICE FOR A MILKING STALL

(75) Inventors: Marianne Kristina Åkesdotter Kullberg, Farsta; Kenneth Percy Birger Gustafson, Södertälje, both of (SE)

(73) Assignee: Alfa Laval Agri AB, Tumba (SE)

( * ) Notice: Subject to any disclaimer, the term of this patent is extended or adjusted under 35 U.S.C. 154(b) by 0 days.

(21) Appl. No.: 09/341,621

(22) PCT Filed: Jan. 15, 1998

(86) PCT No.: PCT/SE98/00062

§ 371 Date: Jul. 14, 1999

§ 102(e) Date: Jul. 14, 1999

(87) PCT Pub. No.: WO98/31212

PCT Pub. Date: Jul. 23, 1998

(30) Foreign Application Priority Data

Jan. 17, 1997 (SE) .............................................. 9700119

(51) Int. Cl.⁷ .................................................. A01J 5/04
(52) U.S. Cl. ..................................................... 119/14.2
(58) Field of Search ........................... 119/14.01, 14.02, 119/14.08, 14.05, 14.1, 14.13, 14.14, 14.18, 520

(56) References Cited

U.S. PATENT DOCUMENTS

| | | | |
|---|---|---|---|
| 3,789,798 A | * | 2/1974 | Reisgies et al. ......... 119/14.08 |
| 3,861,355 A | | 1/1975 | Johnson et al. |
| 3,893,422 A | * | 7/1975 | Schnitzler et al. ....... 119/14.08 |
| 5,431,128 A | | 7/1995 | Nilsson et al. |
| 5,809,931 A | * | 9/1998 | Ellis et al. ............... 119/14.08 |

FOREIGN PATENT DOCUMENTS

EP 575214 6/1993

* cited by examiner

Primary Examiner—Thomas Price
(74) Attorney, Agent, or Firm—Hovey, Williams, Timmons & Collins

(57) ABSTRACT

A device is proposed for a milking stall (1) with at least one milking position (2) for an animal (3) and with at least one milking equipment which comprises a milking member (4,5) arranged to being attached to an animal for milking thereof. The device comprises a cabinet (9) which defines an inner space. The cabinet is arranged to comprise a driving arrangement for a remover (14), arranged to remove the milking member (4,5) from the animal (3) after the milking is finished, and an operating panel (11) which the milking equipment is controlled. The driving arrangement is positioned in the cabinet (9) at least at one of two predetermined driving positions which are adapted to a first operating position and a second operating position, respectively, of the cabinet in said stall (1).

20 Claims, 6 Drawing Sheets

Fig 7
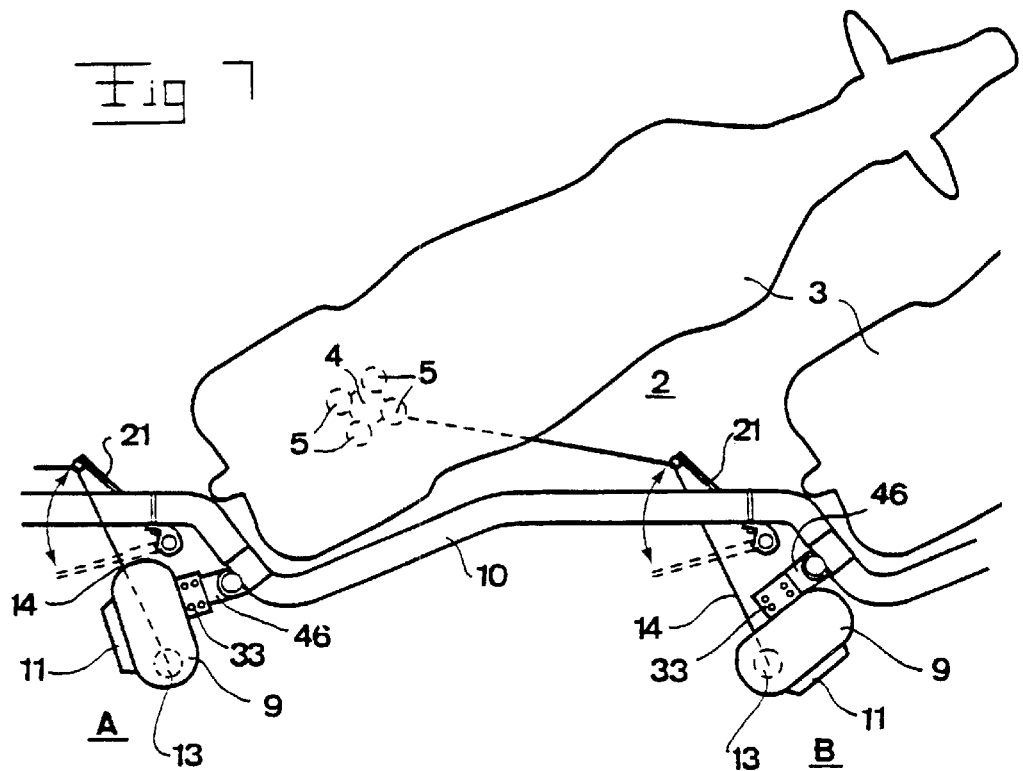
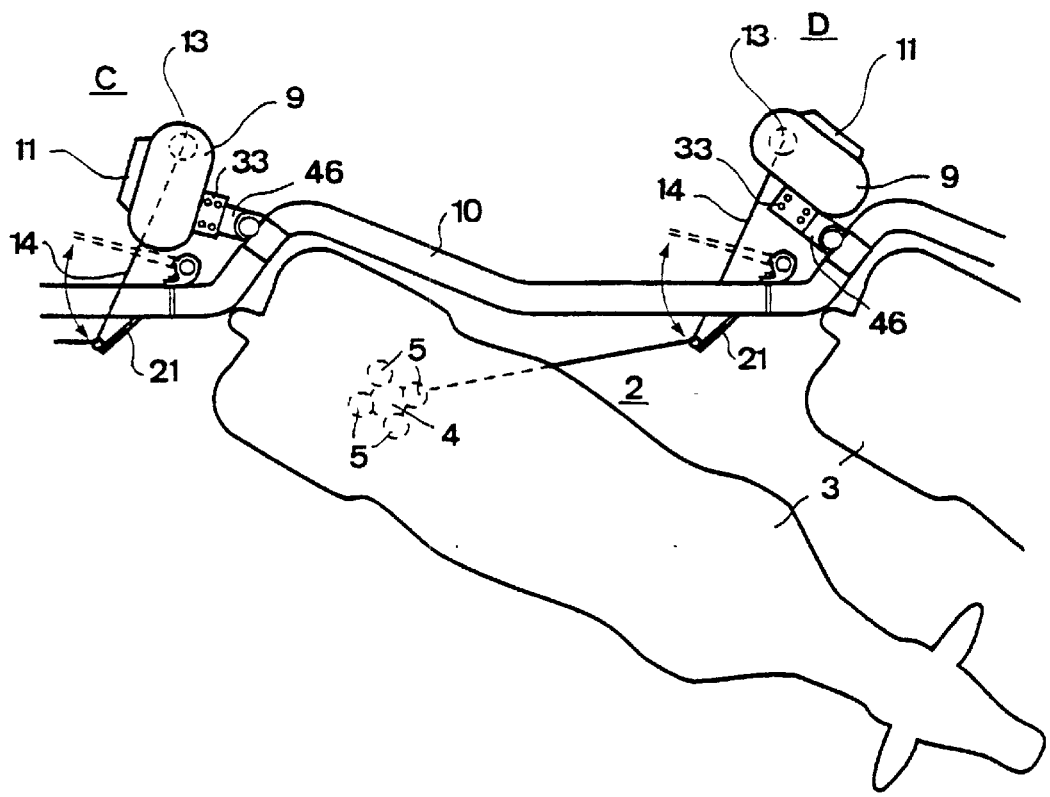

DEVICE FOR A MILKING STALL

BACKGROUND OF THE INVENTION

1. Field of the Invention

The present invention relates to a device for a milking stall.

In a conventional milking stall, there is a milking equipment with a lot of different components. These components comprise usually a milking member in the form of a number of teatcups which may be connected to a common claw, a long milk conduit connecting the claw to a milk-collecting member and to a vacuum source for transferring a milking vacuum to the teats, a holding member, or a so called service arm, for holding and supporting the long milk conduit, a pulsator arranged to provide a pulsating vacuum for a pulsating chamber in each teatcup, a remover for removing the milking member from the teats after the milking is finished, a control unit for controlling the vacuum level of the milking equipment and an operating panel for supervising and controlling of the milking procedure and the milking equipment. It is thereby known to provide these different components at different locations in the milking stall.

It is also known to provide at least some of these components in a cabinet in order to protect them and have them easily accessible at one single location. However, such a cabinet reduces the flexibility because it is more difficult to adapt the milking equipment to different stall configurations. Such stall configurations comprise, for instance, a centrally provided milking parlour with a plurality of animal positions provided at two sides of the parlour. In this case, such a cabinet must be adapted to be mounted on both the sides, which in practice implies that the cabinet must be manufactured in different variants for being located at different operating positions in the milking stall. Furthermore, for ergonomical reasons, it is sometimes desirable to provide the milking equipment in a so called "split configuration", i.e. in such a way that the remover, the pulsator, the indicating lamp etc. of one milking equipment are located at one animal, while the operating panel of this equipment is located at the animal at the adjacent position. In that way, it is possible for the operator, standing in a comfortable working position, to operate the milking member by the right hand and at the same time use the left hand to serve the operating panel. Also in this case, the cabinet must be manufactured in a plurality of different variants. It is to be noted that the remover, which comprises a driving member and a cord extending between the driving member and the milking member, must be located at a determined position in the milking stall in relation to the animal to be milked to permit the milking member to be removed from the teats of the animal in a simple way.

2. Description of the Prior Art

Consequently, when according to prior art it is desired to satisfy the need of different stall configurations, it is necessary to utilize many different cabinet parts for being able to manufacture such cabinets in a plurality of different variants. Therefore, the manufacture is complicated and expensive. It is also not practically possible to change afterwards a cabinet to be suitable to another stall configuration than the one intended originally.

SUMMARY OF THE INVENTION

The object of the present invention is to remedy the above-mentioned problems and to provide a device which makes it possible, in a more flexible way, to collect a number of components of a milking equipment in one cabinet. More closely, it is aimed at such a cabinet which may be built of a small number of common parts for being located at different operating positions in the milking stall.

This object is achieved by the device initially defined and characterized in that the driving arrangement is provided to be positioned in the cabinet at different positions of at least two predetermined driving positions which are adapted to a first operating position and a second operating position, respectively, of the cabinet in said stall. By preparing, in this manner, the cabinet for two driving positions, the same cabinet can be used at different operating positions in the milking stall. Furthermore, it is possible, at all different operating positions, to obtain a pulling direction favourable for the driving arrangement, i.e. the milking member may always be pulled off in a suitable direction. For example, the same cabinet may be used for a location at two opposite sides of the milking parlour.

According to an embodiment of the invention, the driving arrangement comprises a driving member and an elongated element, such as a cord, a wire, a chain or the like, which element is provided to connect the driving member to said milking member, and furthermore, the driving arrangement comprises a guide member provided to guide the path of the elongated element.

According to a further embodiment of the present invention, the cabinet comprises a first attachment member, which is provided for the mounting of the cabinet in the milking stall and provided horizontally at distance from a horizontal center line through the cabinet, and a second attachment member provided to position the driving member in one of said two driving positions in the inner space of the cabinet, in such a manner that said center line intersects the driving member. In this way, the driving member will retain its position in the cabinet at both the operating positions. Furthermore, the cabinet, horizontally seen, may advantageously be elongated with two opposite ends, wherein the first attachment member is provided in the vicinity of one of the ends and the other attachment member is provided in the vicinity of the other end. Thereby, a certain distance may be secured between the attachment point of the cabinet and the pulling point of the driving member, in such a manner that the driving member is able to pull out the milking member to a desired position after milking.

According to a further embodiment of the present invention, the cabinet comprises a wall portion which is arranged to be mountable in one of a first turning position, in which the wall portion extends essentially vertically and is adapted to the first operating position, and a second turning position, in which the wall portion likewise extends essentially vertically but is turned 180° from its first turning position and is adapted to the second operating position. Furthermore, the cabinet may comprise a top portion and a bottom portion, which are mountable at the wall portion. The guide member may comprise a passage through the bottom portion for the elongated element. Thereby, each of the top portion and the bottom portion may be mountable at the wall portion in a first rotational position which is adapted to the first operating position and in a second rotational position, in which the top portion or the bottom portion is horizontally rotated essentially 180° in relation to the first rotational position, wherein the second rotational position is adapted to the second operating position.

According to further embodiments of the present invention, the device also comprises an indicating lamp which is arranged to indicate when milking is going on and provided on the bottom portion, and a door portion arranged to close the inner space of the cabinet in an openable manner, wherein the operating panel is arranged on the door portion. Furthermore, the cabinet may comprise means for a pivotable suspension of the door portion along two opposite side edges of the door portion and the door portion may be suspendable with the aid of said means on one side edge when the cabinet is in the first operating position and suspendable with the aid of said means along a second side edge when the cabinet is in the second operating position.

According to a further embodiment of the invention the milking stall comprises a first milking position and a first milking equipment, and a second milking position and a second milking equipment, wherein the driving member of the first milking equipment and the operating panel of the second milking equipment are received by the cabinet for the first milking equipment. Thereby, it is possible to arrange the cabinet of the invention in a so called "split configuration", which means that the operator in an ergonomically correct way may handle the milking member by one hand and control the milking process by the other hand via the control panel.

According to further embodiments of the present invention, it also comprises a control unit, arranged to enable the control of the vacuum level of the milking equipment and provided in the inner space of the cabinet, a pulsator provided in the inner space of the cabinet, a passage provided in the bottom portion for a vacuum conduit arranged to extend between the pulsator and the milking member, a passage provided in the top portion for a vacuum conduit arranged to extend between the control unit and a vacuum source of the milking equipment, and a member provided in the top portion for the supply of fresh air to the inner space of the cabinet.

BRIEF DESCRIPTION OF THE DRAWINGS

The present invention is now to be explained more closely by means of different embodiments shown by way of example and with reference to the attached drawings.

FIG. 7 shows a view from above of the device according to the invention in different stall configurations.

DETAILED DESCRIPTION OF DIFFERENT EMBODIMENTS

Figure 1:
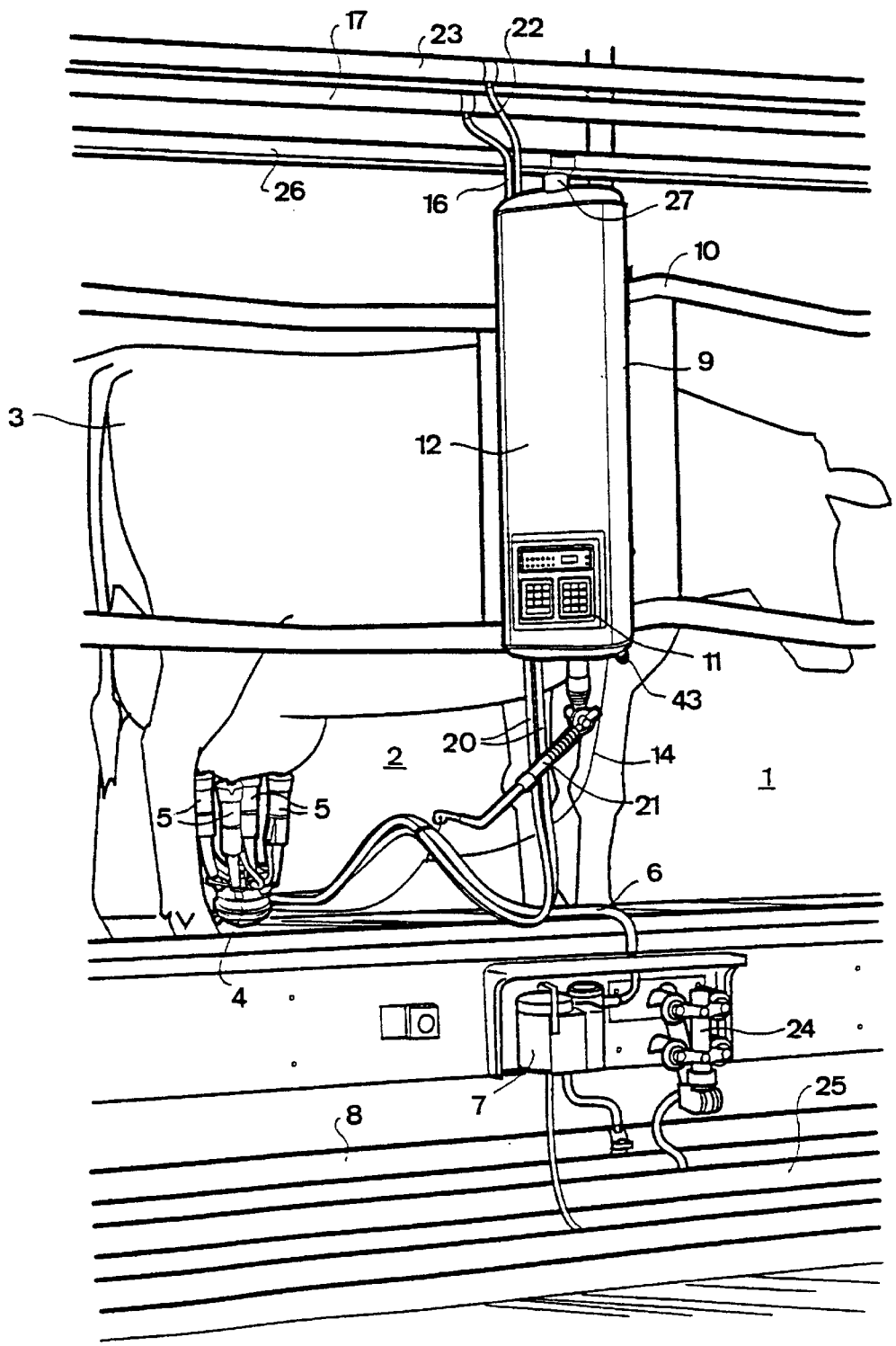
FIG. 1 shows a perspective view of a device according to the present invention at a milking position in a milking stall.
Figure 2:
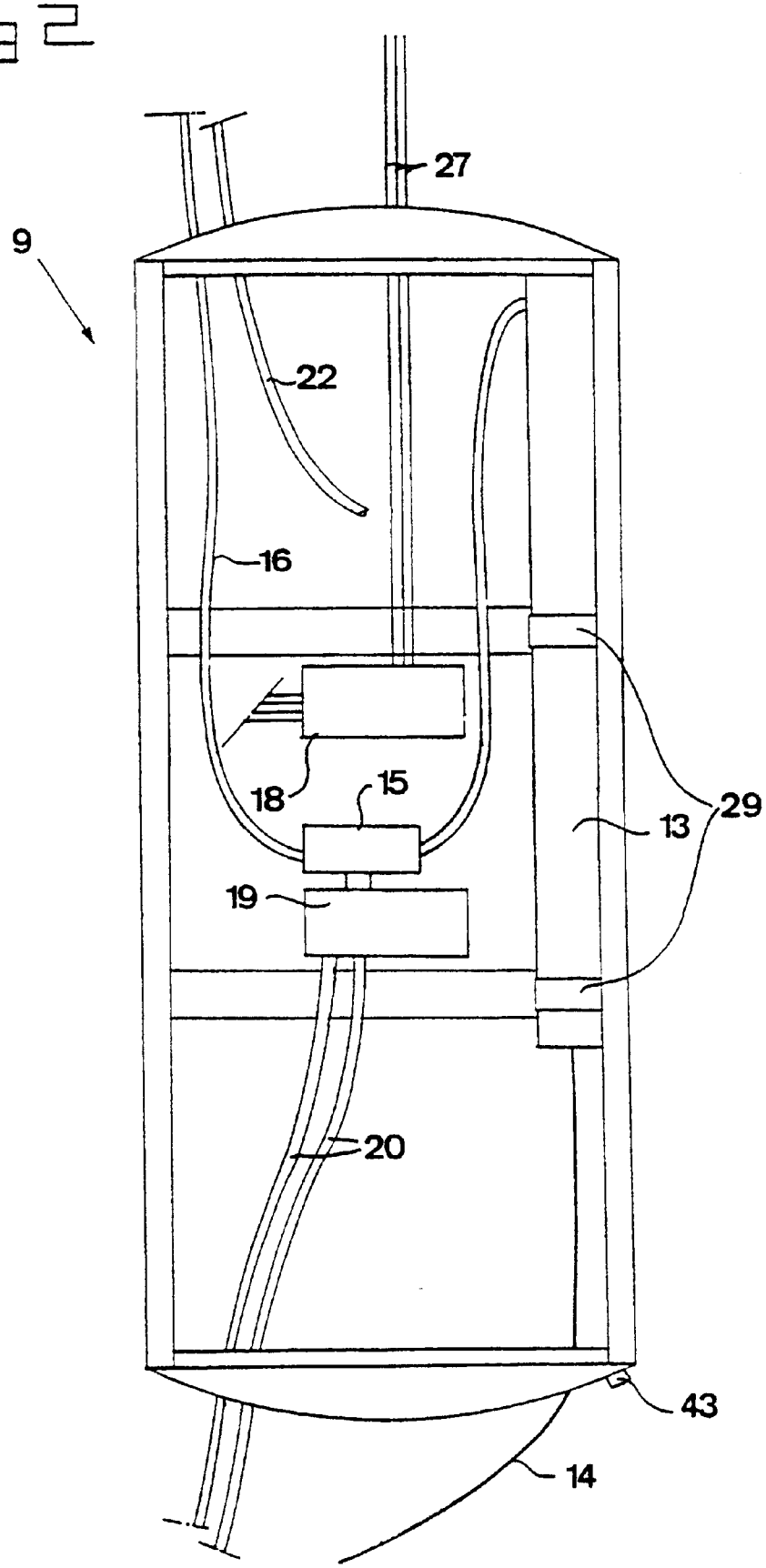
FIG. 2 shows an open cabinet of the device in FIG. 1.

FIG. 1 shows the device according to the invention in a milking stall 1 at a milking position 2 where a cow 3 is present and is milked. For performing the milking, the milking stall 1 comprises a milking equipment which comprises a lot of different components. It is to be noted that only some of the components necessary for the milking are shown in FIG. 1. For example, no vacuum pump is shown. The milking equipment shown in FIG. 1 comprises a milking member with a claw 4 and four teatcups 5 connected to the claw and each being attached to a teat of the cow 3. From the claw 4, a long milk conduit 6 extends to a milk flow meter 7 and from there to a milk transporting conduit 8. Furthermore, in FIG. 1 a cabinet 9 is shown, which comprises further components of the milking equipment. The cabinet 9 is attached to a wall arrangement 10 which forms a limit between the milking stall and a milking parlour in which the operator performing the milking is positioned. The cabinet 9 is attached by means of attachment members to be described more in detail below in connection with the description of FIG. 4. The cabinet 9 comprises an operating panel 11 which is provided on a door portion 12 of the cabinet 9. In FIG. 2, the cabinet 9 is shown without the door portion and thereby the components appear which are provided in the inner space of the cabinet 9. For removing the milking member from the teats of the cow 3 after the milking is finished, a driving arrangement is provided, which comprises a driving member 13 housed in the cabinet 9. The driving member 13 comprises a pneumatic power cylinder which through an elongated element of the driving arrangement, in the embodiment disclosed a cord 14, is connected to the claw 4. The cabinet 9 also houses a control unit 15 by which the vacuum level of the milking equipment may be kept on and adjusted to a suitable level. The control unit 15 is via a vacuum conduit 16 connected to a system vacuum conduit 17. The control unit 15 is also connected to the pneumatic power cylinder of the driving member 13 and via a passage connected to a pulsator 19 which is arranged to provide a pulsating vacuum for a pulsating chamber of each of the teatcups 5. The pulsating chambers of the teatcups 5 are via two pulsating conduits 20 connected to the pulsator 19. The long milk conduit 6 and the pulsating conduits 20 form together a bundle of conduits, which is held and supported by a support member 21 fixedly provided at the wall arrangement 10 and shaped as an arm protruding from the wall arrangement 10. The support member 21 is also arranged to support and guide the cord 14. Furthermore, the milking equipment comprises a fresh air conduit 22 which is connected to a fresh air channel 23 and arranged to supply fresh air to the inner space of the cabinet 9. Furthermore, in FIG. 1 a cleaning device 24 is disclosed, which has means for receiving the teatcups 5 after the milking is finished and for the supply of cleaning liquid to the teatcups 5 and the claw 4 via a cleaning conduit 25. Finally, in FIG. 1 a system conduit 26 is shown for different connections to, for instance, an electric current supply and an overall control system. A branching conduit 27 from the system conduit 26 leads, as shown in FIG. 2, into the inner space of the cabinet 9 and is connected to a connecting terminal 18 which in turn is connected to the operating panel 11. From the operating panel 11, connections extend to different components of the cabinet 9.

Figure 3:
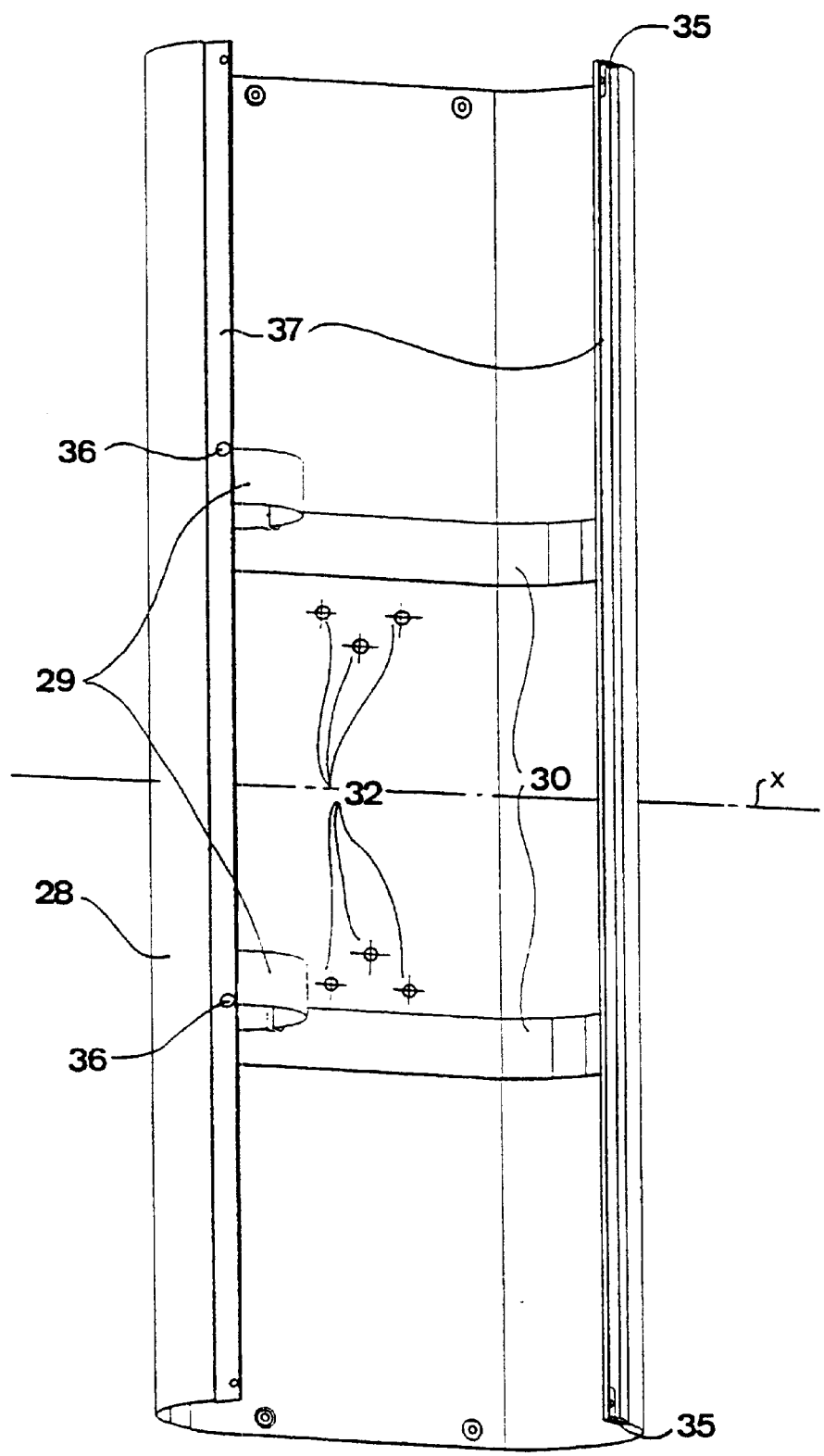
FIG. 3 shows a perspective view of a wall portion of the cabinet of the device in FIG. 1.
Figure 4:
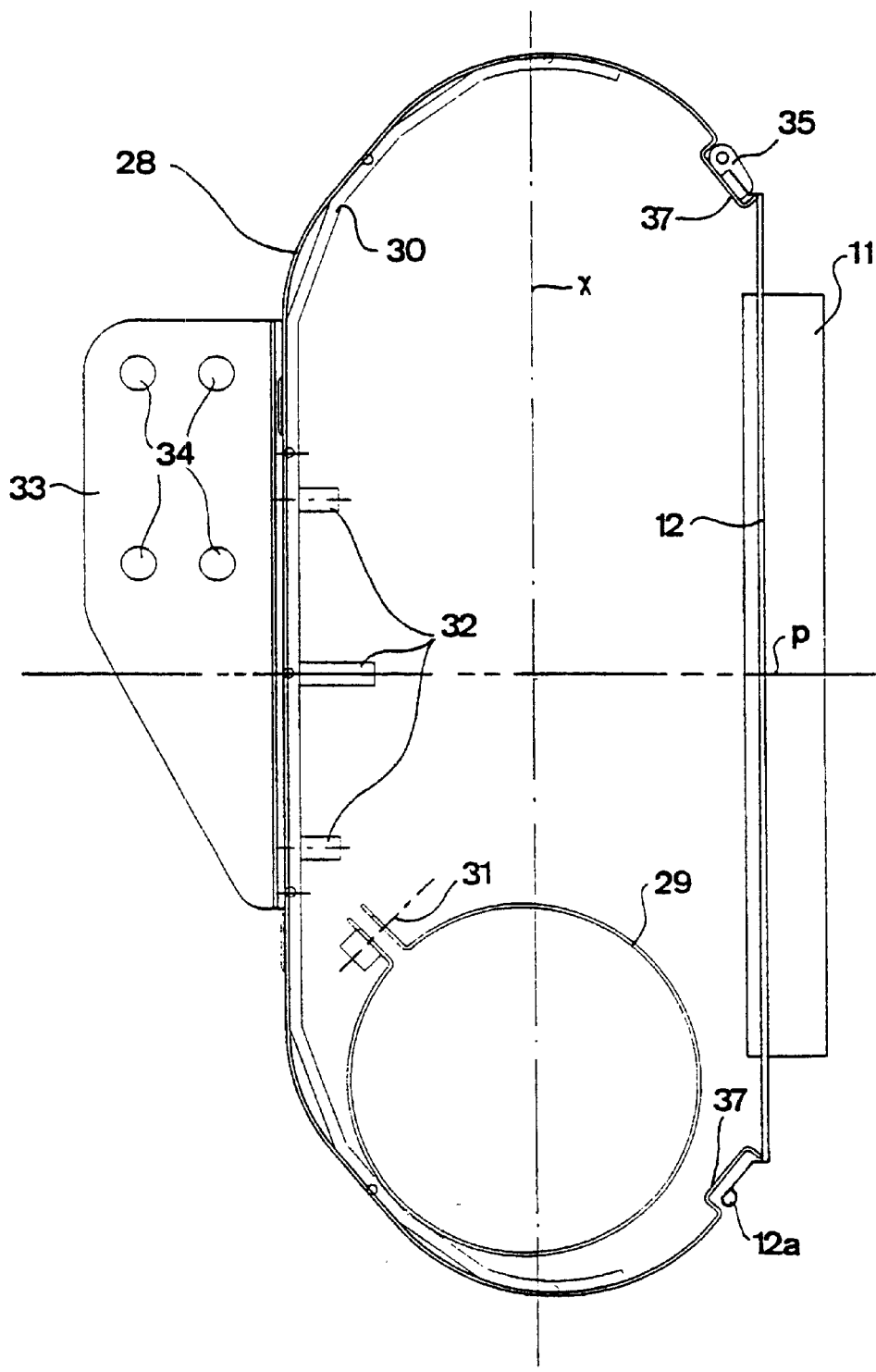
FIG. 4 shows a view from above of the wall portion in FIG. 3 together with a door portion suspended on the wall portion.

FIGS. 3 and 4 show a wall portion 28 of the cabinet 9. The wall portion 28 is shaped like a sweep which extends around a great part of the cabinet 9 and encloses its inner space. Consequently, the wall portion 28 is produced by essentially one piece of a sheet. In the inner space of the cabinet 9, two attachment members 29 are provided at the wall portion 28, for example welded to a support sheet 30 which is attached to the wall portion 28. The attachment members 29 may certainly also be attached in another way, for example by rivet or screw connections. The attachment members 29 comprise a sheet strip arranged to extend around the driving member 13 and to be tightened against the driving member 13 by for example a screw connection 3 indicated in FIG. 4. Furthermore, the wall portion 28 comprises a number of mounting members 32 which for example are welded to the wall portion and by means of which, the control unit 15 and the pulsator 19 may be mounted in the inner space of the cabinet 9. As appears from FIG. 3, the mounting members 32 are provided symmetrically with respect to a horizontal center axis x. This means, if the wall portion 28 is turned upside-down the control unit 15 and the pulsator 19 may be arranged in the same way as shown in FIG. 2 in the turned cabinet 9, i.e. beneath the connecting terminal 18. The attachment members 29 are likewise provided identically and symmetrically with respect to the center axis x which consequently will intersect the driving member 13. Consequently, the driving member 13 may be provided into two opposite directions in the wall portion 28 in such a manner that the end from which the cord 14 extends always will point downwardly irrespective of the direction the cabinet 9. Furthermore, two attachment members 33 are provided at the wall portion 28 for the attachment of the cabinet 9 to the wall arrangement 10. As appears from FIG. 4, the attachment hole 34 of the attachment members 33 are provided beside a vertical plane p, which extends through the cabinet 9 and the wall portion 28. As appears from FIGS. 3 and 4, the door portion 12 is pivotably attached to the wall portion 28 by means of two hinges 35 attached to the wall portion 28 at which a rod is attached. The rod extends through one of two passages 12a which each extends along one of the longitudinal side edges of the door portion 12. The door portion 12 is furthermore lockable by locking members not shown, which are provided in holes 36 in a C-shaped edge portion 37 of the wall portion 28. As appears from FIG. 4, the wall portion 28 comprises two such parallel edge portions 37. Each edge portion 37 comprises two holes 36. The rod of the hinges 35 is furthermore releasably attached in such a manner that it may be moved from one side edge of the door portion 12 to the other opposite side edge, which means that the door portion 12, irrespective of in which direction it is being open, always may have the operating panel 11 provided in its lower part. As appears in FIG. 4, the cabinet 9 has, seen horizontally, an elongated shape with the attachment holes 34 in the vicinity of one end and the attachment members 29 of the driving member 13 in the vicinity of the other end. Consequently, if the cabinet 9 is turned upside-down, the attachment holes 34 will consequently be located on the other side of the vertical center plane p, with respect to the configuration shown in FIG. 4. Likewise, the attachment members 29 of the driving member 13 will be moved from side of plane p as shown to the opposite side.

Figure 5:
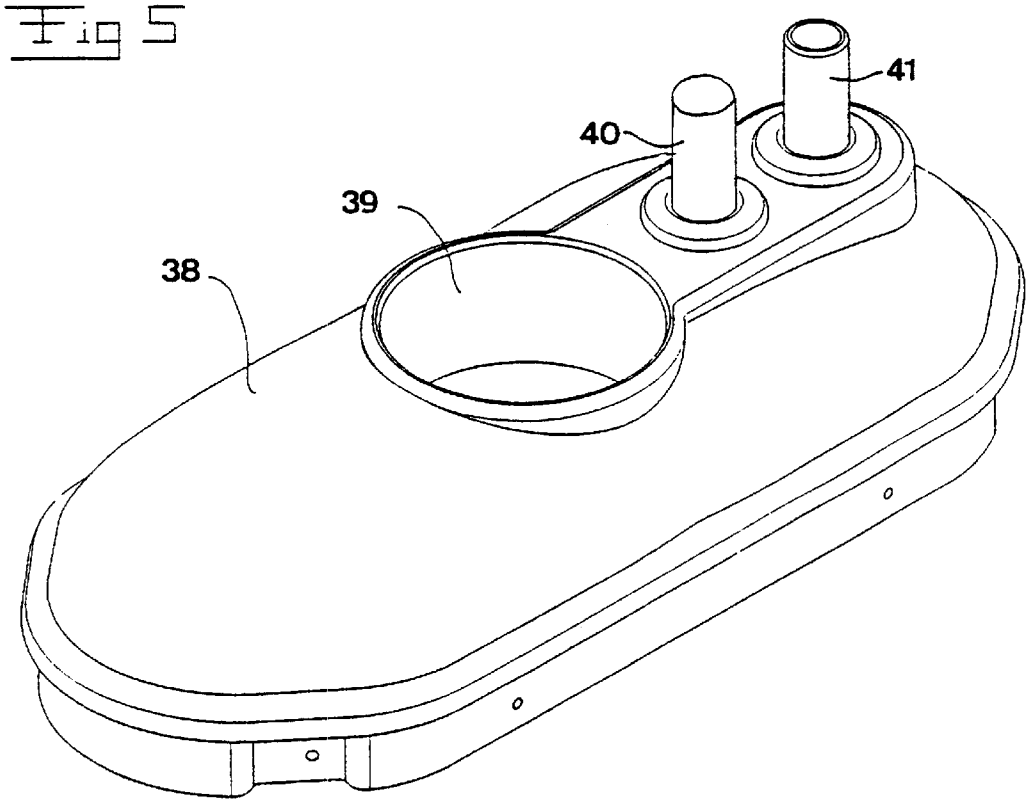
FIG. 5 shows a perspective view of a top portion of the cabinet of the device in FIG. 1.
Figure 6:
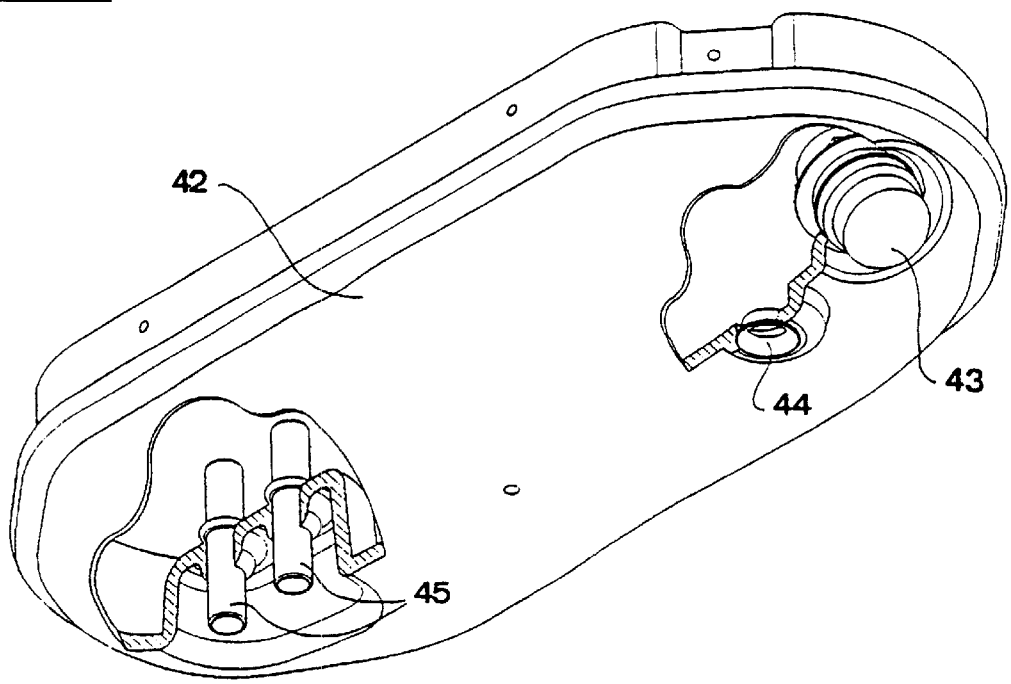
FIG. 6 shows a perspective view of a bottom portion of the cabinet of the device in FIG. 1.

FIG. 5 shows a perspective view of a top portion 38 which delimits the inner space of the cabinet 9 upwardly. The top portion 38 comprises a passage 39 for the branching conduit 27 and possibly a set of cables, a second passage 40 for the fresh air conduit 22 and a third passage 41 for the vacuum conduit 16. FIG. 6 shows a perspective view of a bottom portion 42 arranged to delimit the inner space of the cabinet 9 downwardly. The bottom portion 42 comprises an indicating lamp 43 arranged to indicate when milking is going on. The driving arrangement comprises guide means for guiding the pulling path of the cord 14 between the driving member 13 and the claw 4, i.e. except said support member 21 also a guide member in the shape of a first passage 44 through the bottom portion 42. Furthermore, the bottom portion 42 comprises two other passages 45 for the pulsation conduits 20. Both the top portion 38 and the bottom portion 42 are symmetrical in such a way that they may be rotated 180° and consequently take two different rotational positions in relation to the wall portion 28.

FIG. 7 shows the cabinet 9 according to the invention in four different operating positions in a milking stall 1 with four different milking positions 2, two on each side of a milking parlour. It is to be noted that all conduits and cables, like the milk conduit 6 and the pulsating conduits 20, have been omitted in FIG. 7, which however shows the extension of the cord 14. The cabinet 9 is mounted in a so called left-straight position at A. This means that the cabinet 9 is provided to the left in the milking stall seen in a cow's free walking direction through the milking stall 1. The fact that the cabinet 9 is mounted in straight position means that all components, which are housed or comprised by the cabinet 9, belong to one and the same milking equipment for milking of a cow. At B, the cabinet 9 according to the invention is mounted in so called left-split position. This means, as at A, that the cabinet 9 is provided to the left, but also that the components of the cabinet 9 are shared by two different cows 3. In particular, this means that all components except the operating panel 11 relate to one milking equipment while the operating panel 11 relates to the adjacent milking equipment. At C and D, the cabinet 9 according to the invention is provided in a corresponding way as at A and B, respectively, but on the right side. In FIG. 7, the support member 21 is shown in two positions, a milking position by continuous lines and a parlour position by broken lines. The support member 21 comprises a spring element by which the support member 21 is forced to take the milking position. In this position, the milk conduit 6 and the pulsating conduits 20 are held in a suitable position during the milking and the milking member may easily be pulled off the teat by the driving member 13 and the cord 14. When the milking member has been pulled to a position against the support member 21, the continued pulling force of the driving member 13 which is applied to the cord 14 will move the support member 21 to the parlour position shown by broken lines, in which the teatcups 5 are easily accessible for cleaning and application to the next cow. According to the invention, the cabinet 9 may thus be positioned at the four operating positions A–D without deterioration of the function of the support member 21. As furthermore appears from FIG. 7, the two attachment holes 34 closest to a center line x are intended for the operating positions B and D, while the two attachment holes 34 farthest away from the center line x are intended for the operating positions A and C. The attachment members 33 are thereby mounted on an arm 46 provided turnably to the wall arrangement 10. In the operating positions B and D, the horizontal center axis x is essentially parallel to the arm 46 and in the operating positions A and D essentially perpendicular to the arm 46.

The present invention is not restricted to the embodiments shown above but may be varied and modified within the scope of the following claims. The driving member 13 may be realized in other forms than a pneumatic power cylinder, for example as a hydraulic one or as an engine which is driven electrically, pneumatically or hydraulically. It is to be noted that the cabinet 9 not necessarily needs to comprise all the components disclosed and it may include further components, not shown.

What is claimed is:

1. A device for a milking stall configured to receive an animal in at least one milking position, the stall having at least one milking equipment comprising a milking member arranged to be attached to the animal for milking thereof, the device comprising:

a cabinet defining an inner space, the cabinet including a driving arrangement to remove the milking member from the animal after the milking is finished; and an operating panel by which the milking equipment is controllable, wherein the cabinet is positionable in the stall in a first operating position and a second operating position, wherein the driving arrangement is positionable in the cabinet in at least a first predetermined driving position and a second predetermined driving position, and wherein the first predetermined driving position is adapted to the first operating position and the second predetermined driving position is adapted to the second operating position.

2. A device according to claim 1, wherein the driving arrangement comprises a driving member and a flexible elongated element, which element is provided to connect the driving member to said milking member, and that the driving arrangement comprises a guide member provided to guide the path of the elongated element.

3. A device according to claim 2, wherein the cabinet comprises a first attachment member, which is provided for the mounting of the cabinet in the milking stall and located horizontally at distance from a horizontal center line through the cabinet, and a second attachment member provided to position the driving member in one of said two driving positions in the inner space of the cabinet, in such a manner that said center line intersects the driving member.

4. A device according to claim 3, wherein the cabinet, seen horizontally, is elongated with two opposite ends and in that the first attachment member is provided in the vicinity of one of the ends and the other attachment member is provided in the vicinity of the other end.

5. A device according to claim 2, wherein the guide member comprises a passage through the bottom portion for the elongated element.

6. A device according to claim 2, wherein said elongated element is a cord.

7. A device according to claim 2, wherein said elongated element is a wire.

8. A device according to claim 2, wherein said elongated element is a chain.

9. A device according to claim 1, wherein the cabinet comprises a wall portion which is arranged to be mountable in one of a first turning position, in which the wall portion extends essentially vertically and the cabinet is positioned in the first operating position, and a second turning position, in which the wall portion likewise extends essentially vertically but is turned essentially 180° from its first turning position and the cabinet is positioned in the second operating position.

10. A device according to claim 9, wherein the cabinet comprises a top portion and a bottom portion, which are mountable at the wall portion.

11. A device according to claim 10, wherein each of the top portion and the bottom portion is the wall portion in a first rotational position which is the first operating position and in a second rotational position, in which the top portion or the bottom portion is horizontally rotated essentially 180° in relation to the first rotational position, wherein the second rotational position is the second operating position.

12. A device according to claim 10, further comprising an indicating lamp which is arranged to indicate when milking is going on and in that the indicating lamp is provided on the bottom portion.

13. A device according to claim 10, wherein the top portion comprises a member for the supply of fresh air into the inner space of the cabinet.

14. A device according to claim 1, wherein the cabinet comprises a door portion arranged to close the inner space of the cabinet in an openable manner and that the operating panel is arranged on the door portion.

15. A device according to claim 14, wherein the cabinet comprises means for a pivotable suspension of the door portion along two opposite side edges of the door portion and that the door portion is suspendable with the aid of said means on one side edge when the cabinet is in the first operating position and suspendable with the aid of said means along the second side edge when the cabinet is in the second operating position.

16. A device according to claim 15, wherein the milking stall comprises a first milking position and a first milking equipment, and a second milking position and a second milking equipment, and that the driving member of the first milking equipment and the operating panel of the second milking equipment are received by the cabinet for the first milking equipment.

17. A device according to claim 1, further comprising a control unit operatively coupled to the milking equipment to enable the control of the vacuum level therein and positioned in the inner space of the cabinet.

18. A device according to claim 17, further comprising a pulsator operatively coupled to the milking equipment and provided in the inner space of the cabinet.

19. A device according to claim 18, further comprising a vacuum conduit and the bottom portion comprises at least one passage for permitting the vacuum conduit to extend between the pulsator and the milking member.

20. A device according to claim 17, further comprising a vacuum conduit and a vacuum source the top portion comprises a passage for permitting the vacuum conduit to extend between the control unit and the vacuum source for the milking equipment.

* * * * *